Dec. 2, 1941.                L. C. AGAN                2,264,497
                            WORK SUPPORT
                    Filed Jan. 19, 1940         3 Sheets-Sheet 1
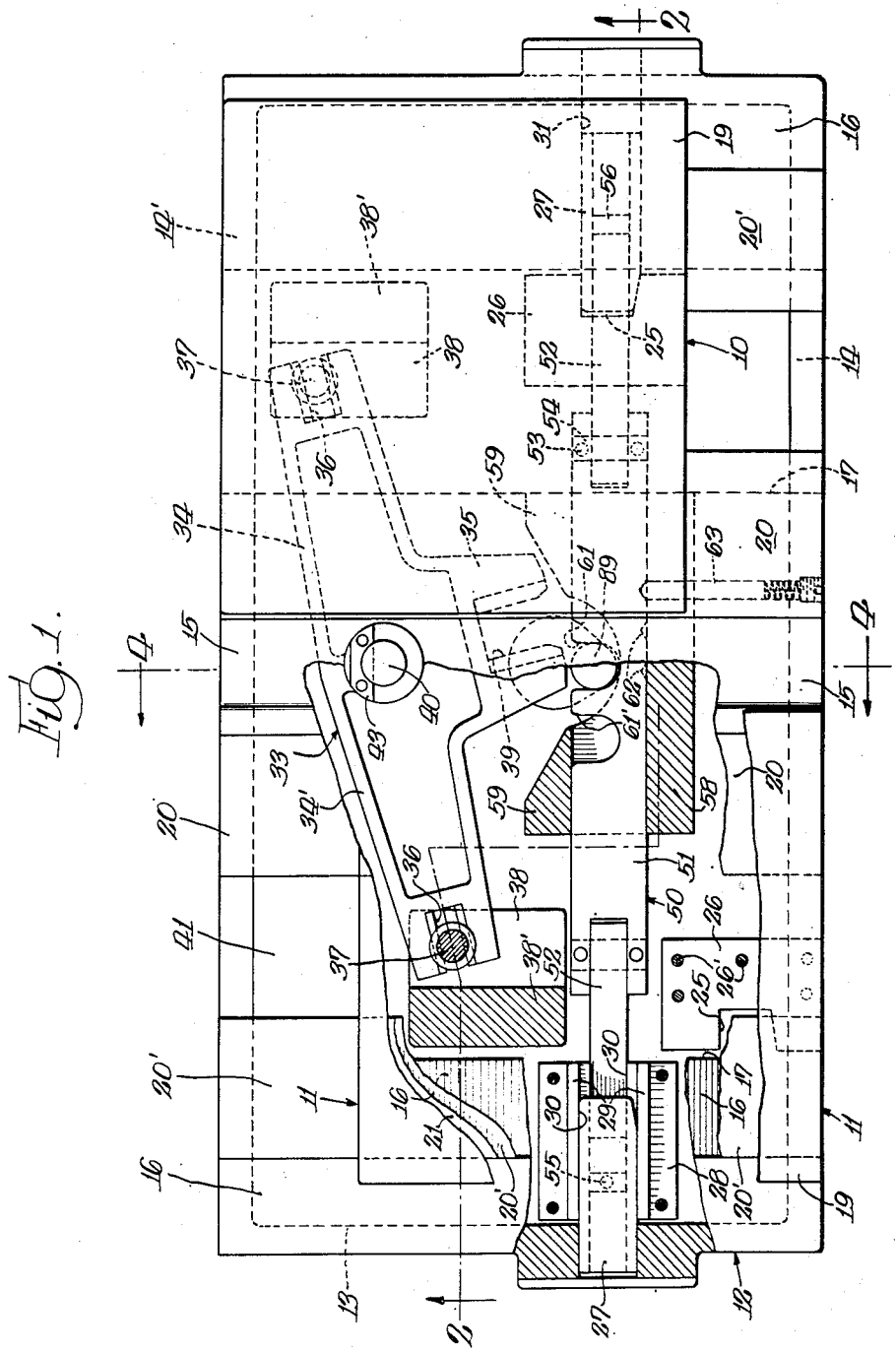
INVENTOR.
Leon C. Agan,
BY
his ATTORNEY.

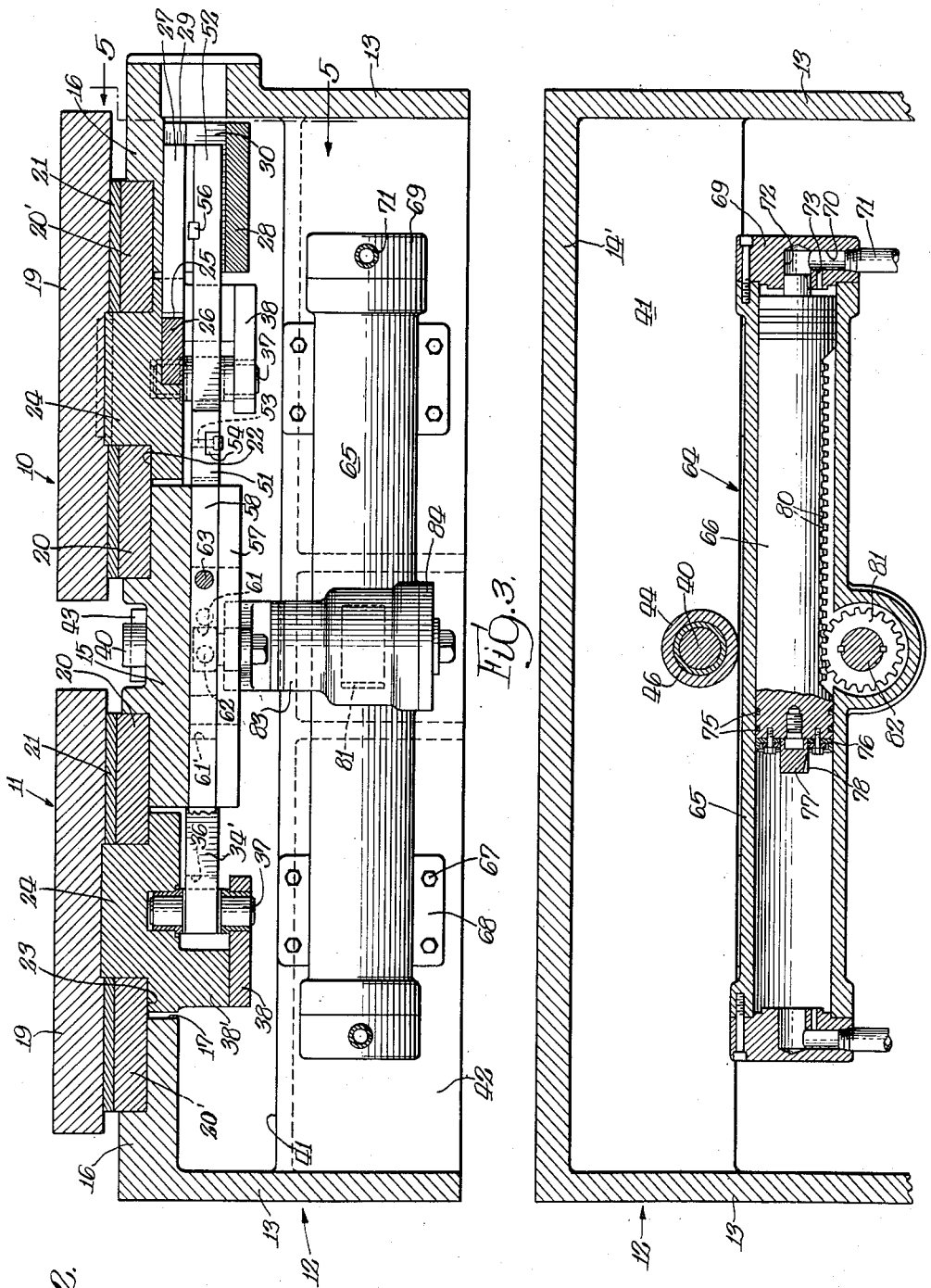

Dec. 2, 1941.  L. C. AGAN  2,264,497
WORK SUPPORT
Filed Jan. 19, 1940  3 Sheets-Sheet 3
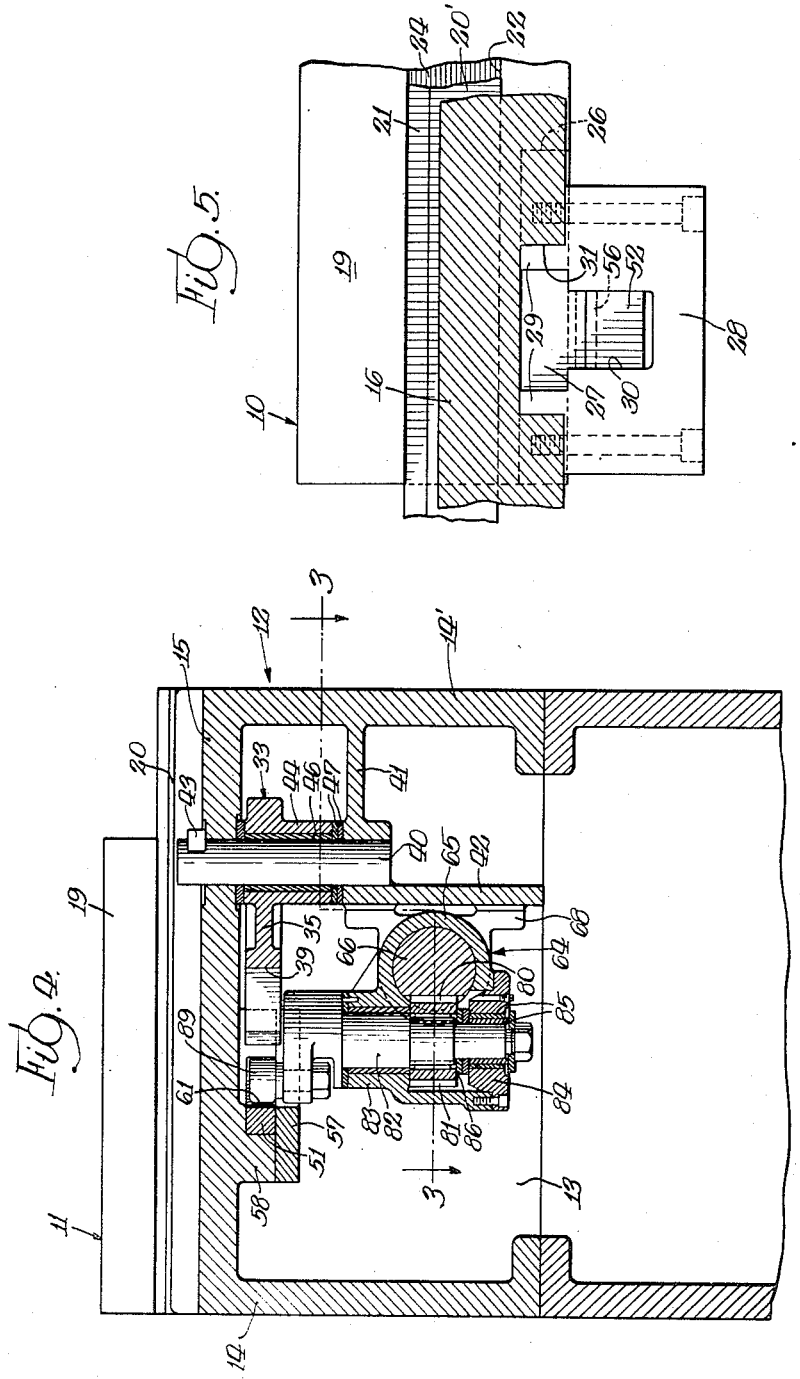
INVENTOR.
Leon C. Agan.
BY
his ATTORNEY.

Patented Dec. 2, 1941

2,264,497

UNITED STATES PATENT OFFICE 2,264,497

WORK SUPPORT

Leon C. Agan, Dexter, Mich., assignor, by mesne assignments, to American Broach & Machine Co., Ann Arbor, Mich., a corporation of Michigan Application January 19, 1940, Serial No. 314,670

14 Claims. (Cl. 90—58)

The invention relates to a work support and particularly to a work support for machine tools, and has as a general object to provide a work support of new and improved construction and operation.

A more particular object of the invention is to provide a new and improved work support having a carriage with a loading and unloading position, and a working position and means for locking the carriage in its working position.

Another object is to provide a work support having a carriage with a loading and unloading position and a working position, which in the shift from one position to another has a slow start and stop and a fast intermediate movement.

Still another object is to provide a work support with a carriage having a loading and unloading position and a working position, which in the shift from one position to another has a slow start and stop and a fast intermediate movement, means for locking the carriage in its working position, and a single power means for actuating the carriage and the locking means at the proper rate and in the proper sequence.

A further object is to provide a work support having such construction and such actuating means as to be readily duplicated for use in a duplex machine.

Still a further object is to provide a work support having two carriages, each with a loading and unloading position and a working position, a locking means for each carriage for locking the same in working position, and a common driving means for the carriages operable successively to unlock the carriage in working position, simultaneously shifting that carriage from working to loading position and the other carriage from loading to working position, and locking in working position the carriage just shifted to that position.

Other objects and advantages will become apparent from the following detailed description taken in connection with the accompanying drawings, in which:

Fig. 1 is a top view of a support embodying the features of the invention with the support shown partially in elevation and partially broken away to successively greater depth so as to show in elevation certain normally hidden parts.

Fig. 2 is a vertical sectional view of the support of Fig. 1, taken approximately along line 2—2 of Fig. 1.

Fig. 3 is a longitudinal sectional view of the power means of the support taken approximately along the line 3—3 of Fig. 4.

Fig. 4 is a vertical sectional view taken approximately along the line 4—4 of Fig. 1.

Fig. 5 is a fragmentary sectional view taken along the line 5—5 of Fig. 2, the parts being enlarged better to details of construction.

For purposes of disclosure the invention is here shown and will hereinafter be described as embodied in a duplex support having a right hand carriage 10 and a left hand carriage 11. These carriages, together with the driving means therefor composing the support, are mounted upon and within a frame 12 forming a unitary structure adapted to be mounted on the bed, base or other suitable part of any of a variety of machines. The frame 12 comprises side walls 13, a front wall 14, a rear wall 14', and a horizontally disposed top composed of a central portion 15 and side portions 16 extending from the front to the rear of the frame. These frame top portions are parallel and are spaced laterally by substantial rectangular openings 17.

Though the carriages 10 and 11 may lie in any plane, and though they may take a variety of forms to accommodate the particular machine with which they are employed, they are here shown and will hereinafter be treated as slidably mounted and horizontally disposed. Accordingly, each of the carriages 10 and 11 comprises a substantially rectangular top 19 slidably mounted on laterally spaced and longitudinally extending parallel way blocks 20 and 20'. Preferably each of the way blocks is faced on its top side with a wear plate 21 of some hardened material to prolong the life of the ways. Each of the way blocks 20 is mounted on the central portion 15 of the top of the frame 12 with one longitudinal edge of each block extending laterally over the opening 17 so as to provide a guide surface 22, the function of which will presently be more apparent. Similarly, the way blocks 20' are mounted on the side portion 16 of the top of the bed, again with one longitudinal edge of each block 20' extending over the opening 17 so as to form a guide surface 23, similar in function to that of surface 22. Depending from the top 19 of each carriage is an elongated block 24 having an inverted T-shape. The stem of the T is made extremely thick and is just slidably received between the inner faces of the way blocks 20 and 20'. The longitudinal flanges forming the cross bar of the T-shaped block extend beneath and cooperate with the surfaces 22 and 23 to retain the carriages against upward displacement.

Each carriage has a withdrawn position where the work piece is loaded onto or unloaded from the carriage and has also an active or working position for presenting the work piece loaded thereon to the cutting tool. In order to assure accuracy during the cutting operation, means is provided for positively locking and holding the carriages 10 and 11 in their working position. To that end, there is formed in the outer side face of the cross bar portion of the block 24 of each carriage a notch 25 (see Figs. 1 and 2). For facility of manufacture and increased life, the notch 25 may be formed in a hardened plate 26 in turn secured, as by bolts 26', in a recess formed in a forward corner of the block 24. The notch 25 is preferably tapered inwardly at least along one edge (see Fig. 1). Adapted to cooperate with each such notch 25 is a locking bolt or pin 27 slidably disposed transversely of the frame 12. Generally, the pins 27 may be said to be mounted in the side portion 16, but, more specifically, the pin 27 is slidable in a guide bracket 28 bolted beneath the portion 16 (see Figs. 2 and 5). Each pin 27 has a T-shaped cross section throughout the major portion of its length with the remainder forming a beveled tip for engagement with the notch 25. The bracket 28 (see Fig. 5) is generally U-shaped with parallel upstanding flanges 29 spaced outwardly of the inner edge of legs of the bracket forming a T-shaped slot 30 in which the pin 27 is guided. The underneath side of the side portion 16 has a groove 31 therein to accommodate the flanges 29 and the pin 27.

Unique means is provided for actuating the locking pins 27 and for reciprocating the carriages. This means is common to the locking means and the carriages and serves successively to unlock the carriage then in working position, simultaneously shift the carriage just unlocked from working to loading position and the other carriage from loading to working position, and locking in working position the carriage just shifted to that position. Such a means comprises generally an actuating member for shifting the carriages, an actuating member for moving the locking pins into locking or unlocked position, and power means for driving the actuating members.

Herein the actuating member for the carriages takes the form of a crank 33 having oppositely disposed arms 34 and 34', and an arm 35 at right angles to the arms 34 and 34'. Each the arm 34 and the arm 34' is formed at its end with a slot 36 for the reception of a vertically disposed pin 37 having its upper end journalled in the block 24 near the forward end thereof and its lower end journaled in the projecting portion of a plate 38 secured to a depending nub 38' on the bottom of the block 24. The arm 35 likewise has formed therein a slot 39 opening through the end of the arm and being preferably slightly flared at its outer end (see Fig. 1). The crank 33 is pivotally mounted upon a vertically disposed shaft 40 which at its upper end projects through and is journaled in the central portion 15 of the top of the frame 12 and at its lower end is journaled in a shelf 41. This shelf projects forwardly from the rear wall 14', extends from side wall to side wall of the frame 12, and is supported along its free edge by a vertical web 42. The shaft 40 is retained against sliding downwardly out of the journals provided by the central portion 15 and the shelf 41 by means of a key 43 which, as best seen in Figs. 1 and 4, is received in a notch cut in the side of the shaft, and rests upon and is preferably secured to the central portion 15 of the top of the frame. Preferably, there is formed integrally with the crank 33 an elongated hub 44 which extends downwardly from the crank and bears upon the shelf 41. The hub 44 thus supports the crank 33 rotatably just beneath the central portion 15 of the top of the frame. A bushing 46 may be provided within the hub and preferably thrust washers 47 are interposed between the hub 44 and the shelf 41.

The actuating member for the locking pins 27 herein takes the form of a bar 50 extending transversely of the frame 12. The bar 50 is composed of an intermediate portion 51 of substantial width and end portions 52 of reduced width which are secured to the portion 51 by means of bolts 53 and a key 54. The end portions 52 in turn are connected by bolts 55 and a key 56 to the locking pins 27. The bar 50 is reciprocably mounted just beneath the central portion 15 of the top of the frame 12 and is supported in that position by a guide plate 57 secured by bolting to a straight rib 58 and a pair of nubs 59 on the underneath side of the central portion 15 of the frame. The rib 58 forms a guide for one edge of the portion 51 of the bar while the nubs 59 guide the other edge and, of course, are so spaced from the rib as to permit the portion 51 of the bar to project slidably therebetween. The nubs 59 are also spaced laterally to expose a portion of the edge of the bar facing the arm 35 of the crank 33. In this exposed edge of the intermediate portion 51 there are formed two recesses 61 and 61'. In the opposite edge, three notches 62 are formed which are engaged by a spring pressed detent 63 yieldably to hold the bar 50 in its neutral or either of its locking positions.

Power for the driving means is derived from a hydraulic motor 64 which herein is of the reciprocatory type comprising a cylinder 65 and a double acting piston 66 reciprocable therein. The cylinder 65 extends transversely of the frame 12 and is supported upon the web 42, preferably being secured by means of bolts 67. Normally the cylinder 65 may be cast with special flanges 68 to facilitate the bolting of the cylinder to the web 42. Each end of the cylinder 65 is closed by a cylinder head 69 provided with a radial passage 70 opening outwardly of the head 69 to provide for the connection of a fluid supply conduit 71 thereto. Opening from the passage 70 to the cylinder is a large central port 72 and a much smaller and eccentric port 73.

The piston 66, as stated, is a double acting piston and thus at each end carries piston rings 75 and also a seal 76 on the end face of the piston. Also carried by each end of the piston 66 is a projecting plug 77 adapted to be received in the port 72 and provided with a tapered slot 78 so that the plug may serve as a cushioning means for arresting shift of the piston in one direction.

To convert the reciprocatory motion of the piston 66 into the desired movement of the bar 50 and the crank 33, one side of the piston 66 is formed with rack teeth 80 which mesh with a pinion 81 keyed to a vertically disposed shaft 82. The shaft 82, as well as the pinion 81, is encased in a cylindrical housing 83 cast integrally with and intersecting the cylinder 65. The lower end of the housing 83 is closed and sealed by a cap 84 which also serves as a journal for the lower end of the shaft 82. Suitable bushings 85 are, of course, provided to effect a fluid-tight seal about the shaft to prevent leakage of fluid therealong, and suitable thrust washers 86 are also interposed between the cap 84 and the pinion 81. At its upper end the shaft 82 projects through the housing 83 and carries eccentrically mounted thereon a roller 89 disposed in the same horizontal plane with the bar 50 and the arm 35 of the crank 33. The pinion 81 and the rack teeth 80 on the piston 66 are so proportioned that shift of the piston from one end of the cylinder to the other will rotate the shaft 82 through one complete revolution.

As stated, the roller 89 is disposed in the same horizontal plane with the bar 50 and the crank 33. Moreover, the roller is adapted to be received in either of the recesses 61 or 61' of the bar and in the slot 39 in the arm 35 of the crank. Thus, as the piston 66 is reciprocated, the roller 89 engages and actuates in proper sequence and to the proper extent both the bar 50 and the crank 33, and thus controls the shift and also the locking of the carriages 10 and 11.

The functioning of the work support disclosed herein, and particularly of the driving means, is best understood from a brief description of the operation thereof. Let it be assumed, therefore, that the parts are in the position shown in Fig. 1, that is, with the right hand carriage 10 locked in its working position, while the left hand carriage 11 is in its withdrawn or loading position. Let it be further assumed that a new work blank has been mounted on the carriage 11 and that the cutting operation on the work blank mounted on the carriage 10 has been completed so that the machine is conditioned for the next operation. If then it is further assumed that an appropriate valve is actuated to supply operating fluid to the right hand end (Figs. 1 to 3) of the fluid motor 64, the operation will be as follows: As the fluid enters the right hand end of the cylinder 65, piston 66 is shifted to the left and through its teeth 80 will cause the shaft 82 to have a counter-clockwise rotation, as viewed in Fig. 1. As a result, during the initial rotation of the shaft 82, roller 89, because of its engagement with recess 61, shifts bar 50 to the right, as viewed in Figs. 1 and 3, an extent sufficient to disengage the locking pin 27 from the notch 25 in the carriage 10. Just at the time that the pin 27 is disengaged from the notch 25, the roller 89 leaves the recess 61 in the bar 50, thereby permitting the bar 50 to remain stationary in its neutral or intermediate position though rotation of the shaft 82 continues. The bar 50 is releasably held in this position by the spring pressed detent 63 engaging a notch 62.

With continued counter-clockwise rotation of the shaft 82, the roller 89 enters the slot 39 in the arm 35 of the crank 33 and thus rocks the crank 33 in a clockwise direction and, through such rocking of the crank, simultaneously shifts the carriage 10 from its working to its withdrawn or loading position, and shifts the carriage 11 from its loading to its working position. As it enters the slot 39 the roller 89 is traveling a portion of its orbit almost parallel to the side of the slot, but as the roller proceeds along its curved path its direction of motion changes until it is moving substantially perpendicular to the face of the slot 39 against which the roller bears, then the orbit curves back toward the bar 50 and the slot 39 is swung to such an angle that as the roller 89 passes out of the slot its direction of travel is substantially tangent to the wall of the slot against which it bears. Thus only a small component of the rotary movement of the roller 89 is at first translated into swinging movement of the crank 33, but this component increases up to the middle of the cycle, after which it diminishes as the curved path of the roller approaches tangency to the face of the slot. Furthermore, the initial contact of the roller with the slotted arm 35 is at a point farther from the pivot 40 than its point of contact during the intermediate portion of the movement; hence, the effective length of the lever arm 35 is reduced as the movement progresses, and the travel of the roller 89 is multiplied to a greater extent by the lever arms of the crank member 33 during the intermediate portion of the cycle than at the initial or at the final portion. As a result of both effects, the movement imparted to the carriages will be slow at the start and the end of the movement, while the intermediate portion of the movement will be at a substantially higher rate. This, of course, has the advantage that the inertia of the carriages and the work blanks mounted thereon will be gradually overcome and thus shock and strain on the parts reduced. After the carriages have been shifted to their new positions, the roller 89 again leaves the slot 39 and this time enters the recess 61' of the bar 50. During the remainder of the rotation of the shaft 82, the bar 50 will thus be shifted further to the right, as viewed in Fig. 1, and as a result the locking pin 27 will engage the notch 25 in the carriage 11 and lock the carriage in its working position.

When the cutting operation on the work blank carried by the carriage 11 has been completed and a new work blank has been loaded on the carriage 10, the suitable valve means controlling the supply of operating fluid to the hydraulic motor 64 is again actuated, this time to supply operating fluid to the left end of the cylinder 65. The piston 66 will now be shifted to the right, as viewed in Fig. 3, and thus will impart to the shaft 82 a clockwise rotation, as viewed in Fig. 1. With such clockwise rotation, the sequence of operation is just reversed, with the bar 50 first shifted to the left to unlock carriage 11, the crank 33 then rocked in a counter-clockwise direction to withdraw carriage 11 and advance carriage 10, and after the carriages have been duly shifted the bar 50 is shifted further to the left to again lock carriage 10 in its working position.

It is believed apparent from the foregoing that a very unique work support has been provided, having the advantages of performing all of the operations of a complex work support with a comparatively fewer number of working parts and a single or common driving means. While the support has been disclosed as a duplex support, the construction is such that it is readily converted from a single to a duplex support, or vice versa, and such conversion is contemplated in the invention. It is also believed apparent that the construction is suitable with carriages other than slidably mounted ones and with carriages disposed other than in a horizontal plane, and it is not intended that the invention is to be limited to a duplex work support having horizontally disposed and slidably mounted carriages, but it is intended to cover all modifications and alternative constructions falling within the spirit and scope of the invention as defined in the appended claims.

I claim as my invention:

1. A work support comprising, in combination, a carriage having a loading and a working position, and means for shifting the carriage from one position to the other, said means comprising a rotatable driving member and a driven member having a surface initially engageable with the driving member in approximately tangential relation to the path of rotation thereof, said surface being then shifted to extend transversely of said path and finally arriving at a tangential position in relation thereto for shifting the carriage with a movement having a slow start and stop and a fast intermediate movement.

2. A work support comprising, in combination, a carriage having a loading and a working position, a pivotally mounted crank having one arm in engagement with said carriage to shift the same from one position to another upon rotation of said crank, and means comprising a driving member having an orbital movement by which it initially engages a part of said crank in approximately tangential relation, then in transverse relation and finally again in substantially tangential relation, thus imparting initial and final small angular velocity to said crank and large angular velocity to said crank during the intermediate portion of its rotation.

3. A work support comprising, in combination, a carriage having a loading and a working position, a pivotally mounted crank having one arm in engagement with said carriage and having another arm formed with a slot, and reversible power means for actuating said crank including a follower having an orbital movement, said follower engaging in the slot in said crank with the slot initially in substantially tangential relation to the orbit of the follower to impart to the crank a small angular velocity during the initial movement of said crank, said orbit then extending transversely of the slot to produce an increased angular velocity of the crank during a major portion of the movement, and finally extending again in substantially tangential relation to the slot to effect a subsequent reduced angular velocity at the end of the movement.

4. A work support comprising, in combination, a carriage having a loading and a working position, mechanism for shifting said carriage from one position to another, mechanism for locking said carriage in working position, and reversible power means for actuating said mechanisms, said means including a single element having an orbital movement by which it is operable to engage and actuate said locking mechanism and to engage and actuate a member of said shifting mechanism, the initial and final portions of such engagement of said element with said member occurring with the contacting part of the member disposed in substantially tangential relation to the orbit of said element to impart to said carriage a slow start and stop and the intermediate portion of the engagement being maintained with the contacting surface of said member extending transversely of said orbit to provide a fast intermediate movement of the carriage in its shift from one position to another.

5. A work support comprising, in combination, a carriage having a loading and a working position, mechanism for shifting said carriage from one position to another, independent mechanism for locking said carriage in working position, and power means for actuating said mechanisms operable through a forward and reverse cycle, said means including a single element operable during one portion of its forward cycle to engage said shifting mechanism for moving said carriage from its loading to its working position and thereafter disengaging from said shifting mechanism and engaging said locking mechanism and actuating the same to lock said carriage in working position, said element being operable first to shift the reverse cycle of the power means first to shift said locking mechanism to unlocked position and then to disengage itself therefrom and engage said shifting mechanism to return said carriage from its working to its loading position.

6. A work support comprising, in combination, a carriage having a loading and a working position, a pivotally mounted crank having one arm engaging said carriage and the other arm providing a slot opening through the end of the arm, a pin for locking said carriage in loading position, a bar for shifting said pin into engaging or disengaging position with respect to said carriage, and a rotatable power driven element operable in its rotation to enter the slot in said crank to swing the same to an extent moving said carriage from its loading to its working position, and operable thereafter to leave the slot and engage said bar to shift said locking pin into locking engagement with said carriage.

7. A work support comprising, in combination, a reciprocably mounted carriage having a loading and a working position, a pivotally mounted crank having one arm engaging said carriage and having a second arm formed with a slot extending longitudinally thereof and opening through the end thereof, a locking pin disposed transversely of said carriage, a bar to which said locking pin is attached shiftable to engage or disengage said pin with said carriage, said bar being disposed opposite the leg of said crank having the slot therein and also having a notch in its edge adjacent said crank, and reversible power means including a rotary member disposed during a portion of its orbit to engage the slot in said crank for rocking the same to shift said carriage from its loading to its working position and after completion of the shift of said carriage to said working position leaving the slot and engaging the notch in said bar to shift said locking pin into engagement with said carriage, the cycle of operation being reversed upon reversal of the operation of said power means.

8. A work support comprising, in combination, a reciprocably mounted carriage having a loading and a working position, a pivotally mounted crank having one arm engaging said carriage and having a second arm formed with a slot extending longitudinally thereof and opening through the end thereof, a locking pin disposed transversely of said carriage, a bar to which said locking pin is attached shiftable to engage or disengage said pin with said carriage, said bar being disposed opposite the arm of said crank having the slot therein and also having a notch in its edge adjacent said crank, a rotatable shaft disposed at right angles to the plane of said crank and said bar, an eccentrically mounted roller carried on the upper end of said shaft disposed to engage the slot in said crank and the notch in said bar during rotation of said shaft, and power means for actuating said shaft including a cylinder and a double acting piston connected to impart clockwise and counter-clockwise rotation to said shaft for effecting actuation of said carriage and the locking means therefor in proper sequence.

9. A work support comprising, in combination, a pair of carriages each having a loading and a working position, a pivotally mounted crank having oppositely disposed legs each engaging one of said carriages, and a leg at right angles to said first mentioned legs having a slot opening through the end thereof, a locking means for each carriage for locking the same in working position, a bar common to said locking means, and a power driven member having a rotary movement disposed in its movement to engage said bar and shift the same to unlock the carriage in working position, to disengage from said bar and engage in the slot of said crank for rotating the same to effect simultaneous shift of the one carriage from its working to its loading position and shift of the other carriage from its loading to its working position and thereafter to disengage from the slot in said crank and again to engage said bar further to shift the same to effect locking of the carriage which stands in working position.

10. A work support comprising, in combination, a frame providing longitudinally extending guideways, a pair of carriages disposed side by side and slidably mounted on said guideways, each of said carriages having a loading and a working position, a pivotally mounted crank having oppositely disposed legs each engaging one of said carriages and a leg at right angles to said first mentioned legs having a slot opening through the end thereof, a locking means for each carriage for locking the same in working position including a pin reciprocably mounted in said frame and adapted to engage said carriage, a bar common to said locking means shiftable transversely of the direction of movement of said carriages, said bar having an intermediate position in which both locking means are disengaged from the carriages and extreme positions in which one only of the carriages is locked, a pair of recesses in the edge of said bar adjacent the last mentioned leg of said crank, and a power driven member having a rotary movement and carrying a roller disposed in the plane of said bar and said crank to engage the recesses in said bar and the slot in the last mentioned leg of said crank, said roller in its rotary movement first engaging one of the recesses in said bar and shifting the same to unlock the carriage in working position, thereafter disengaging from said bar leaving the same in its intermediate position and engaging in the slot in said crank for rotating the same to effect simultaneous shift of one carriage from its working to its loading position and shift of the other carriage from its loading to its working position, and finally disengaging from the slot in said crank and engaging the other recess in said bar further to shift the same to effect locking of the carriage which stands in working position.

11. A work support comprising, in combination, a frame providing longitudinally extending guideways, a pair of carriages disposed side by side and slidably mounted on said guideways, each of said carriages having a loading and a working position, a pivotally mounted crank having oppositely disposed legs each engaging one of said carriages and a leg at right angles to said first mentioned legs having a slot opening through the end thereof, a locking means for each carriage for locking the same in working position including a pin reciprocably mounted in said frame and adapted to engage said carriage, a bar common to said locking means shiftable transversely of the direction of movement of said carriages, said bar having an intermediate position in which both locking means are disengaged from the carriages and extreme positions in which one only of the carriages is locked, a pair of recesses in the edge of said bar adjacent the last mentioned leg of said crank, and power means for shifting said bar and rocking said crank comprising a hydraulic motor of the double acting reciprocable piston type, a rotatably mounted shaft oscillated by said motor, and a roller eccentrically mounted with respect to said shaft and disposed in the plane of said bar and said crank whereby it has successive engagement with one recess in said bar, the slot in said crank, and the other recess in said bar to effect successively an unlocking of both carriages, a shift of one carriage from working to loading position and of the other carriage from loading to working position, and a shift of said bar to lock the carriage in working position.

12. A work support comprising in combination, a pair of carriages each having a loading and a working position, means interconnecting said carriages for simultaneous movement in opposite directions, means for causing such movement including a member having a slot open at one end, locking means for said carriages including a longitudinally movable bar operable to lock at least one of the carriages at either limit of its movement and to release both carriages when it stands at an intermediate position, and a power driven member having a rotary movement disposed in its movement to engage said bar and shift the same to unlock the carriage in working position, to then disengage from said bar and engage in the slot of said member for moving the same to effect simultaneous shifting of one carriage from its working to its loading position and shifting of the other carriage from its loading to its working position, and thereafter to disengage from the slot in said member and again to engage said bar to shift the same further to effect locking of the carriage which stands in working position.

13. A work support comprising in combination, a movable carriage having a loading and a working position and means for shifting the carriage from one position to the other including a movably mounted member having a slot and a power driven member having an orbital movement during which it engages in the slot of said member, initially moving in the slot at a relative small angle thereto so as to impart a relatively small component of its velocity to the slotted member, the orbit of said member extending at a larger angle to said slot during the major portion of the engagement but at a relatively small angle in the final portion thereof whereby the power driven member transmits an increased component of its velocity to the slotted member during said major portion and a reduced component in the final portion of the engagement.

14. A work support comprising in combination, a movable carriage having a loading and a working position and means for shifting the carriage from one position to the other including a pivotally mounted member having a substantially radial slot and a power driven member having an orbital movement during which it engages in said slot, the orbit of said member approaching and receding from the pivot axis of the slotted member during their engagement, said orbit extending in approximately tangential relation to the slot in the initial and final portions of the engagement and extending substantially perpendicular to the slot and nearest to said pivot axis in the intermediate portion.

LEON C. AGAN.